(12) United States Patent
Singh et al.

(10) Patent No.: US 11,386,247 B2
(45) Date of Patent: Jul. 12, 2022

(54) METHOD FOR DESIGNING FOR INDUCTION TIME USING SUPPLEMENTARY CEMENTITIOUS MATERIALS

(71) Applicant: Halliburton Energy Services, Inc., Houston, TX (US)

(72) Inventors: John Paul Bir Singh, Kingwood, TX (US); Thomas Jason Pisklak, Cypress, TX (US); Ronnie Glen Morgan, Waurika, OK (US); Siva Rama Krishna Jandhyala, The Woodlands, TX (US); Krishna Babu Yerubandi, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 145 days.

(21) Appl. No.: 16/637,238

(22) PCT Filed: Apr. 5, 2019

(86) PCT No.: PCT/US2019/026175
§ 371 (c)(1),
(2) Date: Feb. 6, 2020

(87) PCT Pub. No.: WO2020/204956
PCT Pub. Date: Oct. 8, 2020

(65) Prior Publication Data
US 2021/0150104 A1    May 20, 2021

(51) Int. Cl.
*G06F 30/20* (2020.01)
*C04B 28/02* (2006.01)
(Continued)

(52) U.S. Cl.
CPC .............. *G06F 30/20* (2020.01); *C04B 28/02* (2013.01); *C04B 40/0032* (2013.01); *C09K 8/46* (2013.01);
(Continued)

(58) Field of Classification Search
CPC ...... G06F 30/20; G06F 2111/10; C04B 28/02; C04B 40/0032; C09K 8/46; E21B 33/14; E21B 2200/20
See application file for complete search history.

(56) References Cited

U.S. PATENT DOCUMENTS

| 6,009,419 A | * | 12/1999 | Coveney | .............. | G01N 33/383 706/16 |
| 2010/0212892 A1 | * | 8/2010 | Santra | ..................... | C04B 28/32 166/250.14 |

(Continued)

FOREIGN PATENT DOCUMENTS

| WO | WO-2018156123 A1 * | 8/2018 | ......... C04B 40/0032 |
| WO | 2020204952 | 10/2020 | |

OTHER PUBLICATIONS

Preece, S., Billingham, J. & King, A. On the initial stages of cement hydration. Journal of Engineering Mathematics 40, 43-58 (2001). https://doi.org/10.1023/A:1017533810329 (Year: 2001).*

(Continued)

*Primary Examiner* — Crystal J. Lee
(74) *Attorney, Agent, or Firm* — Thomas Rooney; C. Tumey Law Group PLLC

(57) ABSTRACT

A method may include: providing a model of cement induction time; designing a cement composition, based at least partially, on the model of cement induction time; and preparing the cement composition.

19 Claims, 5 Drawing Sheets

(51) Int. Cl.
  *C04B 40/00* (2006.01)
  *C09K 8/46* (2006.01)
  *E21B 33/14* (2006.01)
  *G06F 111/10* (2020.01)
(52) U.S. Cl.
  CPC .......... *E21B 33/14* (2013.01); *E21B 2200/20* (2020.05); *G06F 2111/10* (2020.01)

(56) References Cited

U.S. PATENT DOCUMENTS

| | | |
|---|---|---|
| 2015/0024976 A1 | 1/2015 | Albrighton et al. |
| 2015/0033862 A1 | 2/2015 | Bois et al. |
| 2017/0096874 A1 | 4/2017 | Parsons et al. |
| 2017/0364607 A1* | 12/2017 | Kaushik .............. C04B 40/0032 |

OTHER PUBLICATIONS

ISRWO International Search Report and Written Opinion for PCT/US2019/026175 dated Jan. 3, 2020.
Preece, S. J., Billingham, J., & King, A. C. (2001). Journal of Engineering Mathematics, 40(1), 43-58.
Poole, et al., ACI Materials Journal, Methods for Calculating Activation Energy for Portland Cement, Feb. 2007.
New Strength Model Based on Water-Cement Ratio and Capillary Porosity, by K. S. Pann, Tsong Yen, Chao-Wei Tang, and T. D. Lin, 2003.

* cited by examiner

METHOD FOR DESIGNING FOR INDUCTION TIME USING SUPPLEMENTARY CEMENTITIOUS MATERIALS

BACKGROUND

In well cementing, such as well construction and remedial cementing, cement slurries are commonly utilized. Cement slurries may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement slurry may be pumped into an annulus between the walls of the well bore and the exterior surface of the pipe string disposed therein. The cement slurry may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement slurries also may be used in remedial cementing methods, for example, to seal cracks or holes in pipe strings or cement sheaths, to seal highly permeable formation zones or fractures, to place a cement plug, and the like.

A particular challenge in well cementing is the development of satisfactory mechanical properties in a cement slurry within a reasonable time period after placement in the subterranean formation. Oftentimes several cement slurries with varying additives are tested to see if they meet the material engineering requirements for a particular well. The process of selecting the components of the cement slurry are usually done by a best guess approach by utilizing previous slurries and modifying them until a satisfactory solution is reached. The process may be time consuming and the resulting slurry may be complex. Furthermore, the cement components available in any one particular region may vary in slurry from those of another region thereby further complicating the process of selecting a correct slurry.

BRIEF DESCRIPTION OF THE DRAWINGS

These drawings illustrate certain aspects of some of the embodiments of the present disclosure and will not be used to limit or define the disclosure

DETAILED DESCRIPTION

Figure 1:
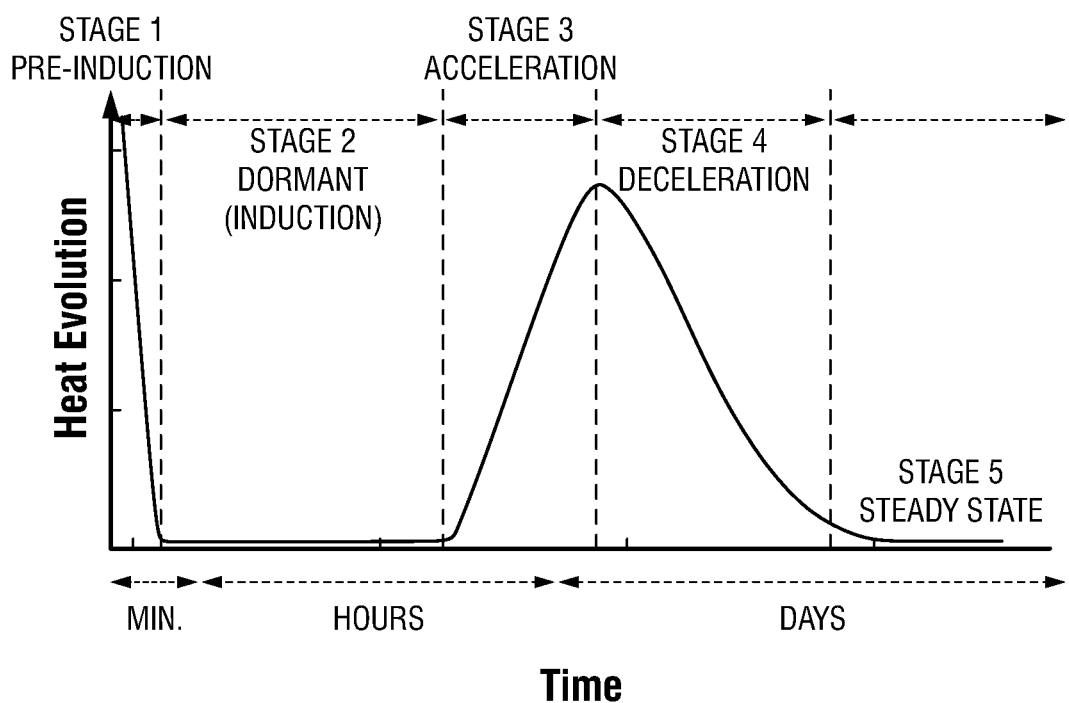
FIG. 1 is a graph illustrating the time dependent heat evolution of a cement slurry.

The present disclosure may generally relate to cementing methods and systems. More particular, embodiments may be directed to using a model of cement induction time in design of a cement slurry.

One common type of cement used in wellbore and surface cementing is Portland cement. Portland cement may undergo a hydration reaction to produce a hardened mass. The various oxides, such as calcium oxides, and silicates present in the Portland cement may undergo a crosslinking reaction induced by water to produce a hydrated cement paste which may then set to form the hardened mass. A Portland cement slurry including Portland cement and water may have four distinct phases of hydration, sometimes referred to herein as cementitious reactions. The first stage, termed the pre-induction period may be characterized by rapid heat evolution and subsequent temperature rise from the heat evolution. During the pre-induction period, calcium and hydroxyl ions may be released into the slurry. The second stage, termed the induction period, may be characterized by a period of extended time where temperature of the slurry decreases and there is little to no compressive strength development. During the induction period, the Portland cement slurry may remain in a pumpable fluid state such that the Portland cement slurry may be placed in a wellbore or other location of interest. The induction period may see continued dissolution of calcium oxide into the slurry and continued reactions which may not significantly contribute to compressive strength. While the exact identity and molecular nature of the reactions that are ongoing during the induction period may not be precisely known, there is an activation energy associated with the induction period that may be related to the chemical identity and concertation of species present in the slurry. The activation energy may be the amount of energy required to overcome an activation barrier to allow the slurry to progress to the rapid strength development stage. The rapid strength development period, sometimes referred to as third stage herein, may be characterized by a rapid increase in reactions that contribute to compressive strength development of the cement slurry. During the rapid strength development period the cement slurry transitions from a pumpable slurry to a slurry that becomes steadily more viscous and to a point where the slurry is considered unpumpable. A slurry may be considered unpumpable when the slurry reaches 70 be (Beardan units of consistency). The American Petroleum Institute (API) Recommended Practice 10B-2 (RP 10B-2), published Dec. 1, 1997, establishes recommended practices for testing oil well cement slurries for thickening time. On of ordinary skill in the art would be able to use the published API tests to perform a thickening test. However, depending on the application, a cement slurry may be considered unpumpable at a higher or lower consistency. The slurry may continue to develop viscosity and eventually set to from a cohesive hardened mass. A cement slurry may have a particular target 24-hour compressive strength which may be the compressive strength achieved after a 24-hour period after mixing dry cement with water. A fourth stage, referred to as the long-term compressive strength development stage may start after the cement slurry has set to form the hardened mass. The long-term compressive strength development stage may be characterized by continued hydration of the oxides and silicates which may contribute to an increase in compressive strength over a period of days to years.

FIG. 1 illustrates the time dependent heat evolution for a typical Portland cement-based slurry. In FIG. 1, the pre-induction stage may be characterized by a rapid heat evolution where the initial hydration takes place followed by a tapering off of heat evolution. The pre-induction stage may last on the order of minutes. The pre-induction stage is followed by the induction stage where the cement slurry is dormant and little to no heat evolution is observed. The induction stage may be measured in hours and may be characterized by little to no compressive strength gain. The third stage may be the acceleration or rapid strength development period characterized by a rapid increase in the heat evolution of the cement slurry caused by an acceleration in the rate of hydration of the cement slurry. The acceleration stage may be measured on the order of hours. The acceleration stage may be followed by a deceleration stage where the hydration reactions slow down, and the hydration reactions proceed at a reduced rate which may be measured on the order of days. The last stage may be the steady state or long-term compressive strength development period.

Induction period for a cement slurry may determine thickening time, and therefore the pump time, of a cement slurry. In wellbore cementing, the transition period where the cement slurry transforms from a pumpable fluid state to a hardened mass may be an important design factor as the cement slurry may be pumped thousands of meters through conduit and may take hours to place. In order to keep the cement slurry in a pumpable state, cement additives such as retarders and accelerators may be added to modulate the pump time by shortening or extending the induction period. As discussed above, a slurry may be considered unpumpable when the slurry reaches 70 bc. The measurement of Beardan units of consistency may be considered a thickening time test which is performed on a moving fluid. Typically, an apparatus including a pressurized consistometer may apply temperature and pressure to a cement slurry while it is being stirred by a paddle. A resistor arm and potentiometer coupled to the paddle may provide an output in units of Beardan units of consistency. Another measure for a cement slurry may be the time to reach 50 psi (345 kPa) under static conditions in an Ultrasonic Cement Analyzer which may be used as an estimation of the initial set time of the cement slurry. The time to 50 psi may be the time it takes for a cement slurry to transition from a pumpable fluid state to a hardened set state. Measuring time to 50 psi may be a surrogate for the end of the induction time period and where the beginning of stage 3 acceleration from FIG. 1 begins. However, measuring time to 50 psi may be inaccurate as the signal may experience excessive scattering when the liquid cement slurry is measured, especially in the early hydration state.

Figure 2:
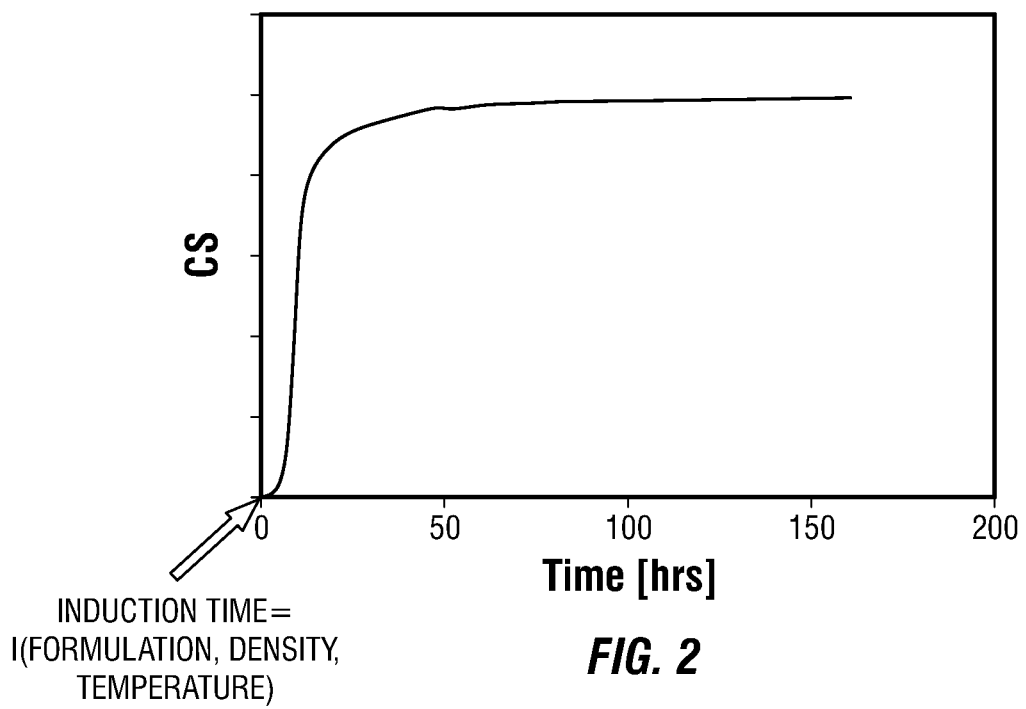
FIG. 2 is a graph of compressive strength versus time for a cement slurry.

FIG. 2 is a graph of compressive strength versus time for a typical Portland cement slurry. The graph shows that during the induction time period the compressive strength remains close to zero indicating that the cement slurry is in a liquid state during the induction period. The induction period is followed by a rapid acceleration in compressive strength development where the cement slurry transitions to a hardened mass. From the observations of compressive strength development, one of ordinary skill in the art will understand that induction time may be closely related to thickening time. As such, designing a cement slurry for an induction time may be correlated to designing for a thickening time.

Figure 3:
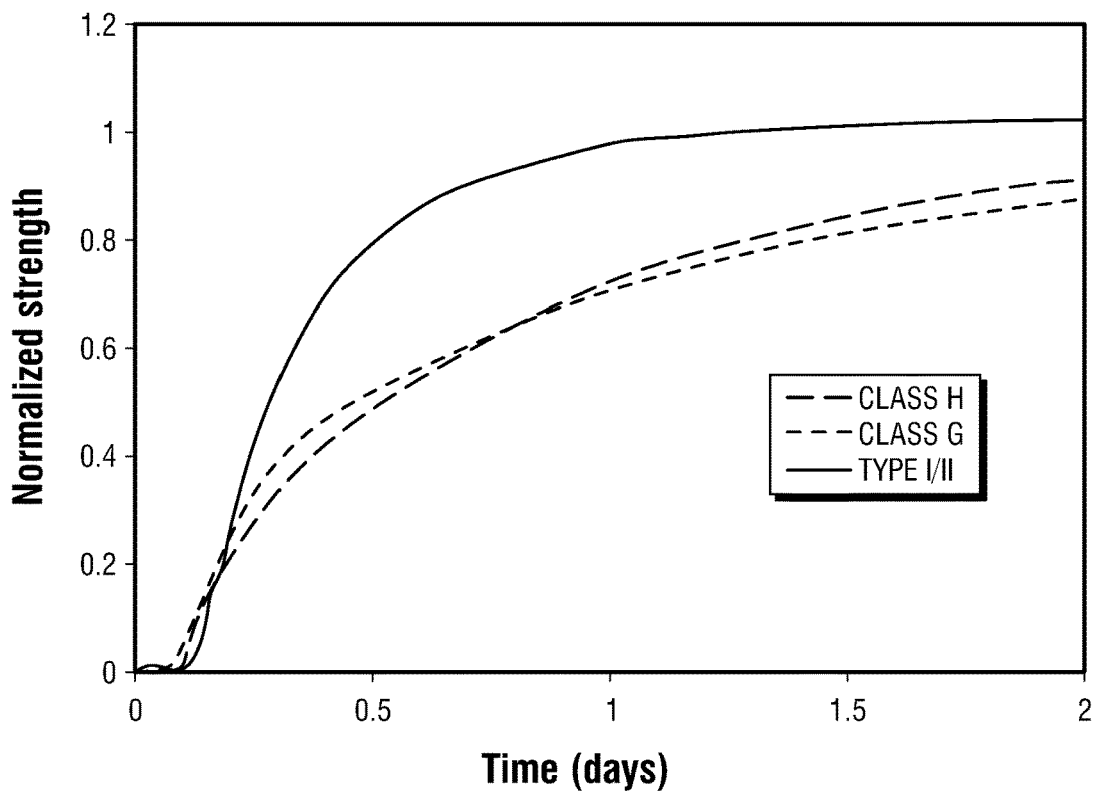
FIG. 3 is a normalized compressive strength development versus time for three classes of neat Portland cement slurries.

FIG. 3 is a graph of normalized compressive strength development versus time for three classes of neat Portland cement slurries. It can be observed that each class of Portland cement exhibits a different induction time. The induction time for each cement slurry is tabulated in Table 1. The differences in induction time may be explained by the varying ratios of $C_2S$, $C_3S$, and other cement components present in each of the cements. Additional factors such as temperature and pressure may also affect the induction time of the cement slurry. Equation 1 is a generalized formula for induction time of a Portland cement-based slurry.

TABLE 1

| Slurry | Induction Time (hours) |
| --- | --- |
| Class H | 2.2 |
| Class G | 1.7 |
| Type I/II | 2.45 |

$$I(\text{Portland}) = f(C2S, C3S, C4AF, C3f, \text{gypsum, other material phases, surface area, density}, T \text{ and } P) \quad (1)$$

Figure 4:
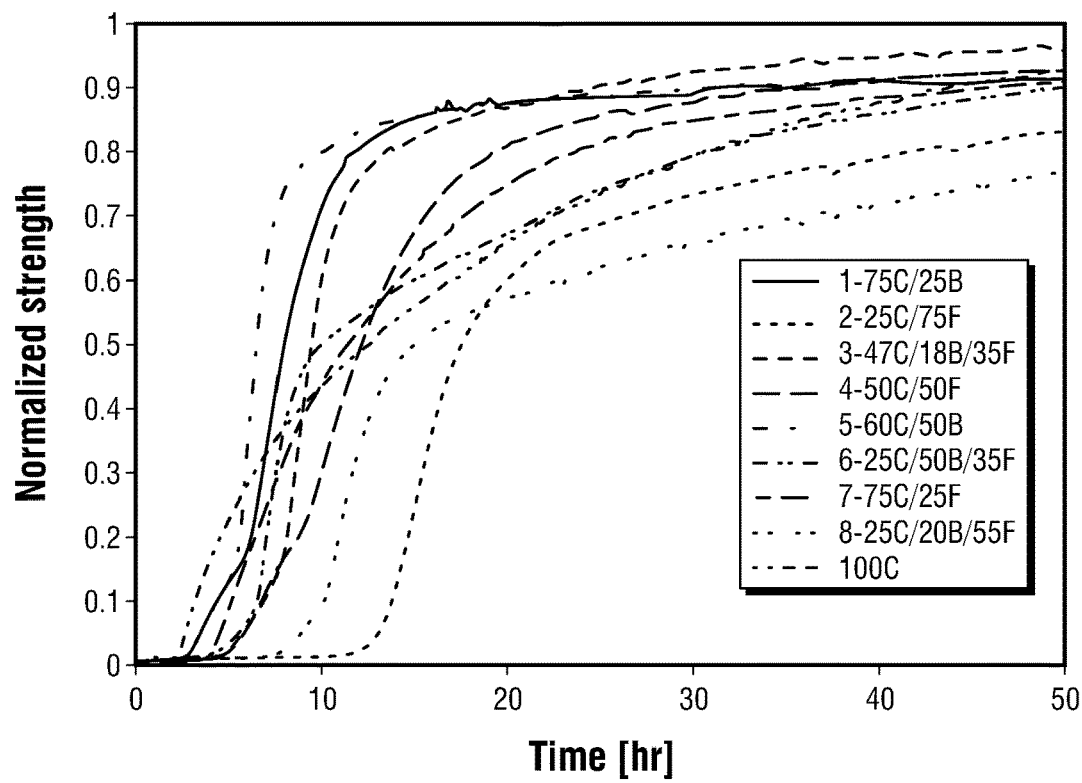
FIG. 4 is a graph of normalized compressive strength versus time for a plurality of Portland cement-based slurries which include additional cementitious materials.

When Portland cement is blended with additional cementitious materials and silica sources, the induction time, and by extension, thickening time, may be shortened or extended as compared to a neat Portland cement slurry. FIG. 4 is a graph of normalized compressive strength versus time for a plurality of Portland cement-based slurries which include additional cementitious materials, silica source, or both. It can be observed that the induction time ranges from about 2 hours to about 12 hours. Equation 2 is a generalized formula for induction time of a Portland cement-based slurry with additional cementitious materials and silica sources.

$$I(\text{Blend}) = f(\text{Portland, Other components, density}, T \text{ and } P) \quad (2)$$

Where, the effect due to other components depends on various factors such as amount of silica, calcium silicate species, lime, calcium carbonate, particle size, specific surface area, crystalline and amorphous phases of silica, alumina, iron oxide, phosphorous oxide, zinc oxide.

Equations 1 and 2 are generalized functions of induction times which may be descriptive of any Portland cement slurry. In general, Portland cement may include 5 main cement components and, in some examples, other cement components that make up a minor portion of the Portland cement. The cement components may include dicalcium silicate ($C_2S$), tricalcium silicate ($C_3S$), tricalcium aluminate ($C_3A$), tetra calcium alumino ferrite ($C_4AF$), and gypsum. As one of ordinary skill in the art will understand, each of the main cement components may hydrate at a different rate and may form different solid phases when they hydrate. Rate of hydration of each cement component in Portland cement may be dependent on many factors including temperature of the cement slurry. In general, a higher temperature may cause the hydration reactions to occur at a faster rate leading to a shorter induction time and more rapid gain of compressive strength. Many of the reactions that take place during hydration of Portland cement may be exothermic such that the temperature of the cement slurry increases during the pre-induction period and the rapid strength development stage. The temperature rise may lead to even faster cementitious reactions and more temperature rise until the cementitious reactions taper off and the Portland cement transitions into the long term compressive strength development stage. Additionally, when the cement slurry is pumped into a wellbore, elevated temperatures in the wellbore may heat the cement slurry causing the cementitious reactions to proceed at an increased rate as compared to cement slurries that are used in surface cementing applications. Although only Portland cement slurries have been discussed until this point, a cement slurry may include many different cementitious components such as Portland cement, pozzolans, clays, silica, fly ash, slag, and many other components. The cementitious reactions that occur in any one cement slurry may be a function of the slurry of the cement slurry and more particularly to the individual cement components and concentrations thereof that are present in the cement slurry.

There may be many potential reactions that occur during hydration of a cement slurry owning to the multitude of cementitious components that may be present in the cement slurry. It may be difficult to model each reaction for a plurality of reasons, including, but not limited to, that not all cementitious reaction may be known, measuring or predicting concentrations of intermediate species may be difficult, and kinetic rate parameters of individual reactions may not be known. As such, directly developing a model of induction time from first principles as a function of concentrations of cementitious components or concentration of the cementitious components that make up the cement slurry may not be possible.

A method to model induction time without directly modeling each cementitious reaction may include physiochemically characterizing a plurality of cementitious components to generate physicochemical data about the plurality of cementitious components, testing the induction time of each or the plurality of cementitious components to generate induction time data for each of the plurality of cementitious components, and applying a regression analysis to the physicochemical data and to generate a regression model of the induction time as a function of physicochemical parameters. Physicochemical tests may include, without limitation, determining the concentration and identity of cement components present in the cement, surface area, particle size, and density, for example, among other physicochemical properties that will be further described in detail below. The testing of induction time may include testing the induction time at various pressures and temperatures. One of ordinary skill in the art, with the benefit of this disclosure, will be able to select and perform an induction time test for any slurry.

As discussed above, one of the variables which may control the length of induction time may be temperature where the cement slurry is placed. In general, the temperature which the cement slurry will be placed at is known or defined. For example, in wellbore cementing applications, a well log may be taken during drilling or during an open hole logging operation such that the temperature at each point in the wellbore is known. Additionally, wellbores drilled in the same geographic area or in the same subterranean formation may exhibit similar temperature profiles such that the temperature profile of one wellbore may be used to predict the temperature profile of another wellbore drilled in the same geographic area or same subterranean formation if a wellbore logging operation is not performed. Those of ordinary skill in the art will be able to measure or predict the temperature at which cement slurry will set. Since the temperature where the cement slurry will be placed at may not be a controllable parameter, one method to control the induction time of the cement slurry may be to adjust the relative concentrations of the components of the cement slurry to shorten or lengthen the induction time. Each component in the cement slurry may include various components that together determine the induction time for a particular cement slurry. As such, adjusting the relative concentrations of each of each component in the cement slurry may increase or decrease the induction time as desired.

Cementitious components may have differing chemical makeups depending on the geographical region where the cementitious component is sourced from. For naturally mined materials such as natural glasses, the difference in chemical makeup may be explained by the natural phenomenon that produced the mined materials. For manufactured cementitious components such as Portland cement, the chemical makeup may be determined by the manufacturing process and raw materials used to make the manufactured component. As such, there may be differences in induction times between, for example, a Portland cement sourced from the middle east versus a Portland cement sourced from north America. The method described above including physiochemically characterizing a plurality of cementitious components may include physiochemically characterizing at least some of the cementitious components available in a region of interest.

As a cement slurry hydrates in the pre-induction and induction period, there may be a minimal increase in compressive strength, and by extension a minimal thickening of the cement slurry. As the cement slurry transitions to the rapid acceleration stage the cement slurry may gain in compressive strength and by extension may become more viscous. The increase in viscosity may be monitored by measuring the cement slurry in a consistometer to generate induction time data, for example. Other methods to generate induction time data may include resistivity measurements, heat evolution measurements, and other induction time measurement techniques for cement slurries. At least some of the components available in a region of interest may be tested for induction time using the techniques described herein or any other techniques for measuring induction time. Not every cementitious component may exhibit an induction time. For example, some components such as silica may not hydrate to form a hardened mass by themselves and therefore would not exhibit an induction time. However, these components may still contribute to the induction time when included in a cement slurry alongside components that do set to form a hardened mass. Cement components that by themselves do not hydrate to form a hardened mass may be included alongside components that do hydrate to form a hardened mass when induction time data is desired to be generated.

Once the physicochemical data for each cement slurry is generated and the induction time data is measured, a regression analysis may be performed on the induction time data and the physicochemical data to estimate the relationships between the induction time and physicochemical properties of cementitious components. Regression analysis may include, without limitation, linear regression analysis and non-linear regression analysis such as linear regression analysis, multivariate linear regression analysis, and polynomial regression, for example. The regression analysis may output a regression model which may be used to approximate the effects of the physicochemical data, such as chemical slurry, on the induction time for cement slurries including cementitious components. One of ordinary skill in the art, with the benefit of this disclosure, would be able to select an appropriate regression analysis for a particular application. The regression model may be used to calculate the induction time of an individual cement component or a combination of cement components. As previously discussed, as the cement slurry hydrates, the components in the cement slurry may dissolve, react, and form intermediate products. The intermediate products may be difficult to directly observe or individually model owing to the complex nature of synergistic interactions between intermediate products. The chemical behavior of cementitious components has been studied by synthesizing a cementitious component in its pure form and hydrating it under controlled conditions. During the actual cement hydration process all the components dissolve into the same solution, and thus the solid hydration products are associated with the solution as a whole. There may be interaction effects between dissolved components such that the final properties of the set cement are a product of the solution rather than individual cementitious components. A regression model derived from induction time data and physicochemical data may indirectly approximate the interactions between the components making up the cement slurry and therefore estimate the induction time of the cement slurry without the need to individually model all reactions. In the regression model, the induction time of the cement slurry may be a dependent variable while the physicochemical properties of the cement slurry may be the independent variables. In addition to calculating the induction time of a cementitious component or blends of cementitious components, the regression model may also allow one of ordinary skill in the art to design a cement slurry with a target induction time. Interaction effects between different components species can also be studied using statistical techniques such as by analysis of variance (ANOVA) and others, for example. Designing a cement slurry may include selecting the identity and concentrations of components of a cement slurry to meet an induction time.

Figure 5:
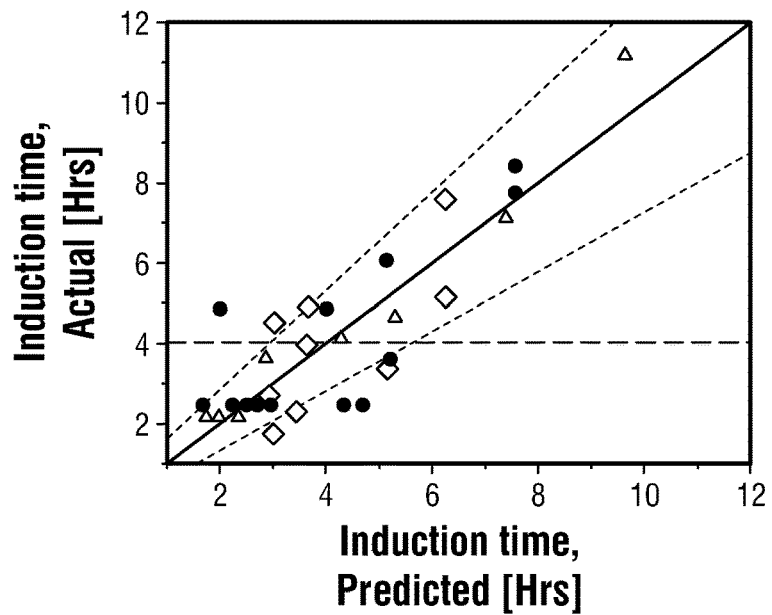
FIG. 5 is a graph of predicted induction time versus measured induction time for a set of cement slurries.

FIG. 5 is a graph of predicted induction time versus measured induction time for a set of cement slurries. Cement slurries were prepared with varying levels of Portland cement and additional cementitious components. The predicted induction time was calculated by a regression model of induction time as described above. It can be observed that regression model of induction time can predict the measured induction times within 95% confidence interval for almost all the cement slurries tested. Results of the test are indicative that the induction time can accurately be represented as a function physicochemical properties and test conditions described in Equation 2.

A method of testing a cement slurry using a regression model of induction time will now be described. The method may include surveying cementitious components available at a location or in a region, obtaining samples of the cementitious components, and characterizing the physicochemical properties of the cementitious components. The results of the physicochemical characterization may be used in a regression model of induction time to predict the induction time of a blend including at least some of the cementitious components. A downhole temperature and pressure log for a wellbore to be cemented may be provided or other techniques previously described to predict pressure and temperature may be employed. In particular, the bottom hole temperature and temperature at top of cement (TOC) may be provided. In some examples, an induction time requirement may also be provided. A proposed cement slurry may be provided wherein the proposed cement blend includes at least some of the cementitious components. The proposed cement blend may be compared against the physicochemical data to determine the physicochemical properties associated with the cement blend which may then be used as an input to the regression model of induction time. An output predicted induction time from the regression model of induction time may then be compared to the induction time requirement. If the predicted induction time is less than the induction time requirement, the proposed cement blend may be modified, for example by changing the ratio of cementitious components, adding additional cementitious components, or removing cementitious components from the proposed cement slurry. The proposed cement slurry may be iteratively modified until the cement slurry meets or exceeds the induction time requirement. Thereafter, the proposed cement slurry may be prepared, and the induction time may be tested using the techniques described herein or any other technique for measuring induction time. If the induction time of the proposed cement slurry meets the induction time requirement, the proposed cement slurry may be selected to be pumped into a subterranean formation.

Another method may include designing a cement slurry using a regression model of induction time combined with a secondary model in a multivariate optimization scheme such that the cement slurry may meet multiple design parameters such as induction time, temperature sensitivity, pump time, reactivity, or any other operational parameter. The secondary model may be a model of compressive strength development for example. Cement components may be selected using the models described herein such that the cement components form a cement slurry which meets the design parameters. Selecting cement components may include selecting an identity and concentration of cement components such that a cement slurry including the selected cement components meets or exceeds a design parameter. An induction time requirement may be provided alongside a second, third, or more requirements corresponding to the secondary model or models selected. A constrained multivariate optimization scheme may be employed using the model of induction time and secondary model such that a cement slurry is generated that meets the induction time requirement and the second, third, or more requirements. The generated cement slurry may then be prepared and tested to ensure conformance with the required induction time and the second, third, or more requirements.

Although only some regression models have been illustrated herein, one of ordinary skill in the art, with the benefit of this disclosure would be able to derive other forms of the equations herein without deviating from this disclosure. In addition, the techniques and equations described herein may also be applied to surface cementing application such as construction cementing.

Measuring physicochemical properties of each selected cement component may include many laboratory techniques and procedures including, but not limited to, microscopy, spectroscopy, x-ray diffraction, x-ray fluorescence, particle size analysis, water requirement analysis, scanning electron microscopy, energy-dispersive X-ray spectroscopy, surface area, specific gravity analysis, thermogravimetric analysis, morphology analysis, infrared spectroscopy, ultraviolet-visible spectroscopy, mass spectroscopy, secondary ion mass spectrometry, electron energy mass spectrometry, dispersive x-ray spectroscopy, auger electron spectroscopy, inductively coupled plasma analysis, thermal ionization mass spectroscopy, glow discharge mass spectroscopy x-ray photoelectron spectroscopy, mechanical property testing, Young's Modulus testing, rheological properties, Poisson's Ratio. One or more of the proceeding tests may be consider API tests, as set forth in the API recommended practice for testing well cements (published as ANSI/API recommended practice 10B-2). Additional API tests not specifically listed above may also be used for the measurements. The physical and chemical properties may be measured for a group of cement components. Two or more of the cement components measured may be different types of cement components (e.g., natural glass, CKD, fly ash, etc.). Two or more of the cement components may be the same type but from different sources (e.g., natural glass from source 1, natural glass from source 2, etc.).

X-ray powder diffraction is one analysis technique that may be used for measuring the physical and chemical properties of the cement components. X-ray powder diffraction is a technique of exposing a sample to x-rays, neutrons, or electrons and measuring the amount of inter-atomic-diffraction. The sample acts a diffraction grating thereby producing a differing signal at different angles. The typical properties that may be measured are the crystalline phase identification for the identification and characterization of a crystalline solid. Other properties may be crystallinity, lattice parameters, expansion tensors, bulk modulus, crystallite size, and phase transitions.

X-ray fluorescence is another analysis technique that may be used for measuring the physical and chemical properties of the cement components. X-ray fluorescence may use short wave x-rays to ionize atoms in a sample thereby causing them to fluoresce at certain characteristic wavelengths. The characteristic radiation released by a sample may allow accurate identification of the component atoms in the sample as well as their relative amounts.

Particle size analysis is another analysis technique that may be used for measuring the physical and chemical properties of the cement components. Particle size analysis may be accomplished through analysis by various laboratory techniques including but not limited to laser diffraction, dynamic light scattering, static image analysis, and dynamic image analysis. Particle size analysis may also provide information about the morphology of a particular sample. Morphology may include parameters such as sphericity and roundness as well as the general shape and aspect ratio of a particle such as disk, spheroid, blade, or roller. With a knowledge of the morphology and particle size, the average surface area and volume may be estimated. Surface area and volume may be important in determining the water requirement as well as reactivity. In general, a relatively smaller particle size may react more quickly than a relatively larger particle size. Also, the relatively smaller particle size may have a greater water requirement to completely hydrate than a relatively larger particle size.

Energy dispersive x-ray spectroscopy is another analysis technique that may be used for measuring the physical and chemical properties of the waste materials. Energy dispersive x-ray spectroscopy is an analytical technique used to analyze the elements present in a sample and determine the chemical characterization of a sample. Other techniques may include Fourier transform infrared spectroscopy, ultraviolet-visible spectroscopy, mass spectroscopy, secondary ion mass spectrometry, electron energy mass spectrometry, dispersive x-ray spectroscopy, auger electron spectroscopy, inductively coupled plasma mass spectrometry (ICP-MS), thermal ionization mass spectroscopy, glow discharge mass spectroscopy, and x-ray photoelectron spectroscopy.

The cement components may be analyzed to determine their water requirement. Water requirement is typically defined as the amount of mixing water that is required to be added to a powdered, solid material to form a slurry of a specified consistency. Water requirement for a particular cement component may be determined by a process that includes a) preparing a Waring® blender with a specified amount of water, b) agitating the water at a specified blender rpm, c) adding the powdered solid that is being investigated to the water until a specified consistency is obtained, and d) calculating the water requirement based on the ratio of water to solids required to reach the desired consistency.

The cement components may be analyzed to determine their specific surface area. Specific surface area generally refers to the total surface area and may be reported as the total surface area per unit mass. Values obtained for specific area are dependent on the analysis technique. Any suitable analysis technique may be used, including without limitation adsorption based methods such as Brunauer-Emmett-Teller (BET) analysis, methylene blue staining, ethylene glycol monoethyl ether adsorption, and a protein-retention method, among other.

Thermogravimetric analysis is another analysis technique that may be used for measuring the physical and chemical properties of the cement components. Thermogravimetric analysis is a method of thermal analysis wherein changes in physical and chemical properties of a sample may be measured. In general, the properties may be measured as a function of increasing temperature, such as with a constant heating rate, or as a function of time with a constant temperature or a constant mass change. Properties determined by thermogravimetric analysis may include first-order phase transitions and second-order phase transitions such as vaporization, sublimation, adsorption, desorption, absorption, chemisorption, desolvation, dehydration, decomposition, oxidation and reduction reactions, ferromagnetic transition, superconducting transition, and others.

In addition to determining physical and chemical properties of the cement components themselves, laboratory tests may also be run to determine behavior of the cement components in a cement slurry. For example, the cement components may be analyzed in a cement slurry to determine their compressive strength development and mechanical properties. For example, a preselected amount of the cement component may be combined with water and lime (if needed for setting). The mechanical properties of the cement slurry may then be determined including, compressive strength, tensile strength, and Young's modulus. Any of a variety of different conditions may be used for the testing so long as the conditions are consistent for the different cement components.

Compressive strength is generally the capacity of a material or structure to withstand axially directed pushing forces. The compressive strength of the cement component may be measured at a specified time after the cement component has been mixed with water and the resultant cement slurry is maintained under specified temperature and pressure conditions. For example, compressive strength can be measured at a time in the range of about 24 to about 48 hours (or longer) after the fluid is mixed and the fluid is maintained at a temperature of from 100° F. to about 200° F. and atmospheric pressure. Compressive strength can be measured by either a destructive method or non-destructive method. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods typically may employ an Ultrasonic Cement Analyzer ("UCA"), available from Fann® Instrument Company, Houston, Tex. Compressive strengths may be determined in accordance with API RP 10B-2, *Recommended Practice for Testing Well Cements*, First Edition, July 2005.

Tensile strength is generally the capacity of a material to withstand loads tending to elongate, as opposed to compressive strength. The tensile strength of the cement component may be measured at a specified time after the cement component has been mixed with water and the resultant cement slurry is maintained under specified temperature and pressure conditions. For example, tensile strength can be measured at a time in the range of about 24 to about 48 hours (or longer) after the fluid is mixed and the fluid is maintained at a temperature of from 100° F. to about 200° F. and atmospheric pressure. Tensile strength may be measured using any suitable method, including without limitation in accordance with the procedure described in ASTM C307. That is, specimens may be prepared in briquette molds having the appearance of dog biscuits with a one square inch cross-sectional area at the middle. Tension may then be applied at the enlarged ends of the specimens until the specimens break at the center area. The tension in pounds per square inch at which the specimen breaks is the tensile strength of the material tested.

Young's modulus also referred to as the modulus of elasticity is a measure of the relationship of an applied stress to the resultant strain. In general, a highly deformable (plastic) material will exhibit a lower modulus when the confined stress is increased. Thus, the Young's modulus is an elastic constant that demonstrates the ability of the tested material to withstand applied loads. A number of different laboratory techniques may be used to measure the Young's modulus of a treatment fluid including a cementitious component after the treatment fluid has been allowed to set for a period of time at specified temperature and pressure conditions.

Although only some select laboratory techniques may have been mentioned, it would be understood that there may many analytical techniques that may be appropriate or not appropriate for a certain sample. One of ordinary skill in the art with the benefit of this disclosure would be able to select an appropriate analytical technique to determine a certain property of interest.

Once the analytical techniques have been performed on the cement components, the data may be categorized and correlated. Some categories may include, but are not limited to, specific surface area, morphology, specific gravity, water requirement, etc. In some examples, the components may be categorized by relative amounts, including amount of at least one following: silica, alumina, iron, iron, calcium, calcium, sodium, potassium, magnesium, sulfur, oxides thereof, and combinations thereof. For example, the components may be categorized based on an oxide analysis that includes without limitation, silica content, calcium oxide content, and alumina content among other oxides that may be present in the cement component. In addition, correlations between the cement components may be generated based on the data or categorization of the data. Additionally, correlations may be defined or generated between properties of the cement components based on the data. For example, the various categories of properties may be plotted against one another. In some examples, water requirement versus specific surface area may be plotted. Accordingly, the water requirement of the cement component may be correlated to the specific surface area so that the specific surface area is a function of water requirement. Specific surface area may be used to predict reactivity of a cement component (or components). However, specific surface area may not always be available for each material as specific surface area analysis typically requires a specialized instrument. Accordingly, if the water requirement may be obtained for the cement component, the correlation between water requirement and specific surface area may be used to obtain an estimate for specific surface area, which may then be used to predict reactivity. In addition to correlations between specific surface area and reactivity, correlations may also be made between specific surface area and other mechanical properties such as tensile strength and Young's modulus.

Another potentially advantageous physical effect that may be mapped is dispersing ability. Some cement components may include relatively spherical particles. The relatively spherical particles may exert a "roller bearing" effect in a cement slurry with water. The effect may cause the other components in the cement slurry to become more mobile thereby dispersing the components in the cement slurry. If particles that are roughly $1/7^{th}$ or smaller than the primary component in a slurry, then the apparent viscosity may decrease. Another potentially advantageous physical property that may be mapped is surface area. Surface area may relate to density wherein a relatively higher surface area particle may lower the density of a cement slurry. Particles which lower the density may be used as a low density additive. Another potentially advantageous effect that may be mapped is particle size. Components with relatively smaller particle sizes may have the ability to form a filter cake against a formation thereby blocking cement from escaping into a formation. Cement components with a small particle size may be used as a fluid loss control agent. With the benefit of the present disclosure, one of ordinary skill would be able to select a cement component and map its properties. One of ordinary skill would also be able to select a secondary property of interest of the cement component and with the benefit of the map, create a slurry with the desired properties.

Another potential benefit of replacing traditional cement additives with silica based cement components is potential simplicity in design by reducing the need for chemical additives. A silica based cement component may partially or fully replace a cement additive as discussed above. The simplicity of the cement slurry may be improved by balancing the required engineering parameters such as compressive strength, mix ability, free water content, and others in order to maximize the amount of silica based cement components. Any remaining deviation from the engineering requirement may be "made up" with the cement additive. In this way, the cement slurry may be simplified since the engineering requirements are met with a blend of silica based components.

Once the data is collected by the chosen laboratory techniques, categorized, and mapped, several operations may be performed on the data in order to yield predictions about a cement slurry that includes mapped cement components. Set properties, for example, may be estimated. A method of estimating the material reactivity based on the reactive index will be described below. Material reactivity may be based on many parameters such as specific surface area and specific gravity, among others. Another use for the mapped data may be to increase cement slurry performance based on parameters such as particle shape, particle size, and particle reactivity. The data may also be used to predict and capture slurry density dependence of compressive strength and use the insight gathered to design improved cement formulations. The data may also be used to predict a slurry to achieve an improved cement formulation. The criteria for just right may be compressive strength, number of components in the cement slurry design, rheology, mechanical properties, fluid loss control properties, thickening times, and others.

Reactivity mapping may be used to estimate various mechanical properties of a cement component, including compressive strength, tensile strength, and Young's modulus. As previously described, correlations may be made between specific surface area and certain mechanical properties, such as reactivity, tensile strength, and Young's modulus. Using these correlations, the mechanical properties for a cement component or combination of cement components may be predicted.

The cement slurries described herein may include water and at least one cement component. The cement slurries may have a density suitable for a particular application. The cement slurries may have any suitable density, including, but not limited to, in the range of about 8 pounds per gallon ("ppg") (959 kg/m$^3$) to about 20 ppg (2397 kg/m$^3$). The water used in the cement slurries may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the cement slurry. The water may be included in an amount sufficient to form a pumpable slurry. The water may be included in the cement slurries in any suitable range, including, but not limited to, in the range of about 40% to about 200% by weight of the cement component or components ("bwoc"). By weight of cement refers to the total weight of all cement components included in the cement slurry. In some examples, the water may be included in an amount in the range of about 40% to about 150% bwoc.

The cement slurry may include a hydraulic cement. A variety of hydraulic cements may be utilized in accordance with the present disclosure, including, but not limited to, those including calcium, aluminum, silicon, oxygen, iron, and/or sulfur, which set and harden by reaction with water. Suitable hydraulic cements may include Portland cements, gypsum, and calcium aluminate cements, among others. Portland cements may be classified as Classes A, C, G, and H cements according to American Petroleum Institute, API Specification for Materials and Testing for Well Cements, API Specification 10, Fifth Ed., Jul. 1, 1990. In addition, in some examples, cements suitable for use in the present invention may be classified as ASTM Type I, II, or III. Where present, the hydraulic cement generally may be included in the cement slurries in an amount sufficient to provide the desired compressive strength, density, and simplify the design by minimizing chemical additives. The hydraulic cement may be present in the cement slurries in any suitable amount, including, but not limited to, in the range of about 0% to about 99% bwoc. In some examples the hydraulic cement may be present in an amount ranging between any of and/or including any of about 1%, about 5%, about 10%, about 20%, about 40%, about 60%, about 80%, or about 90% bwoc. In addition, the cement slurries may also be designed that are free (or essentially free) of Portland cement. Those of ordinary skill in the art, with the benefit of this disclosure, will be able to select an appropriate amount of hydraulic cement for a particular application.

The cement slurry may include a geopolymer cement, which may include an aluminosilicate source, a metal silicate source, and an activator. The geopolymer cement may react to form a geopolymer. A geopolymer is an inorganic polymer that forms long-range, covalently bonded, non-crystalline networks. Geopolymers may be formed by chemical dissolution and subsequent re-condensation of various aluminosilicates and silicates to form a 3D-network or three-dimensional mineral polymer. The activator for the geopolymer cement may include, but is not limited to, metal hydroxides, chloride salts such as KCl, CaCl$_2$, NaCl, carbonates such as Na$_2$CO$_3$, silicates such as sodium silicate, aluminates such as sodium aluminate, and ammonium hydroxide. The aluminosilicate source for the geopolymer cement may include any suitable aluminosilicate.

Aluminosilicate is a mineral including aluminum, silicon, and oxygen, plus counter-cations. There are potentially hundreds of suitable minerals that may be an aluminosilicate source in that they may include aluminosilicate minerals. The metal silicate source may include any suitable metal silicate. A silicate is a compound containing an anionic silicon compound. Some examples of a silicate include the orthosilicate anion also known as silicon tetroxide anion, SiO$_4^{4-}$ as well as hexafluorosilicate [SiF$_6$]$^{2-}$. Other common silicates include cyclic and single chain silicates which may have the general formula [SiO$_{2+n}$]$^{2n-}$ and sheet-forming silicates ([SiO$_{2.5}$]$^-$)$_n$. Each silicate example may have one or more metal cations associated with each silicate molecule. Some suitable metal silicate sources and may include, without limitation, sodium silicate, magnesium silicate, and potassium silicate. Where present, the geopolymer cement generally may be included in the cement slurries in an amount sufficient to provide the desired compressive strength and/or density. The geopolymer cement may be present in the cement slurries in any suitable amount, including, but not limited to, an amount in the range of about 0% to about 99% bwoc. In some examples the geopolymer cement may be present in an amount ranging between any of and/or including any of about 1%, about 5%, about 10%, about 20%, about 40%, about 60%, about 80%, or about 90% bwoc. One of ordinary skill in the art, with the benefit of this disclosure, will be able to select an appropriate amount of geopolymer cement for a particular application.

The cement slurries may include a silica source. Silica may also be referred to as silicon dioxide (SiO$_2$). By inclusion of a silica source, a different path may be used to arrive at a similar product as from Portland cement. For example, a pozzolanic reaction may be induced wherein silicic acid (H$_4$SiO$_4$) and portlandite (Ca(OH)$_2$ react to form a cement product (calcium silicate hydrate). If other compounds, such as, aluminate, are present in the silica source, additional reactions may occur to form additional cement products, such as calcium aluminate hydrates. Additionally, alumina (aluminum oxide Al$_2$O$_3$) may be present in the silica source. Calcium hydroxide necessary for the reaction may be provide from other cement components, such as Portland cement, or may be separately added to the cement slurry. Examples of suitable silica sources may include fly ash, slag, silica fume, crystalline silica, silica flour, cement kiln dust ("CKD"), natural glass, clays, metakaolin, diatomaceous earth, zeolite, shale, and agricultural waste ash (e.g., rice husk ash, sugar cane ash, and bagasse ash), among other. Where present, the silica source generally may be included in the cement slurries in an amount sufficient to provide the desired compressive strength and/or density. The silica source may be present in the cement slurries in any suitable amount, including, but not limited to an amount in the range of about 0% to about 99% bwoc. In some examples the silica source may be present in an amount ranging between any of and/or including any of about 1%, about 5%, about 10%, about 20%, about 40%, about 60%, about 80%, or about 90% bwoc. Those of ordinary skill in the art, with the benefit of this disclosure, will be able to select an appropriate amount of silica source for a particular application.

The cement slurries may include fly ash. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash includes both silica and lime, so it may set to form a hardened mass upon mixing with water. Class F fly ash generally does not contain a sufficient amount of lime to induce a cementitious reaction, therefore, an additional source of calcium ions is necessary for a set-delayed cement slurry including Class F fly ash. In some embodiments, lime may be mixed with Class F fly ash in an amount in the range of about 0.1% to about 100% by weight of the fly ash. In some instances, the lime may be hydrated lime. The fly ash may be present in the cement slurries in any suitable amount, including, but not limited to an amount in the range of about 0% to about 99% bwoc. In some examples the fly ash may be present in an amount ranging between any of and/or including any of about 1%, about 5%, about 10%, about 20%, about 40%, about 60%, about 80%, or about 90% bwoc. Those of ordinary skill in the art, with the benefit of this disclosure, will be able to select an appropriate amount of fly ash for a particular application.

The cement slurries may include slag. Slag is generally a by-product in the production of various metals from their corresponding ores. By way of example, the production of cast iron can produce slag as a granulated, blast furnace by-product with the slag generally including the oxidized impurities found in iron ore. Slag generally does not contain sufficient basic material, so slag cement may be used that further may include a base to produce a settable slurry that may react with water to set to form a hardened mass. Examples of suitable sources of bases include, but are not limited to, sodium hydroxide, sodium bicarbonate, sodium carbonate, lime, and combinations thereof. The slag may be present in the cement slurries in any suitable amount, including, but not limited to an amount in the range of about 0% to about 99% bwoc. In some examples the slag may be present in an amount ranging between any of and/or including any of about 1%, about 5%, about 10%, about 20%, about 40%, about 60%, about 80%, or about 90% bwoc. Those of ordinary skill in the art, with the benefit of this disclosure, will be able to select an appropriate amount of slag for a particular application.

The cement slurries may include cement kin dust or "CKD." CKD refers to a partially calcined kiln feed which is removed from the gas stream and collected, for example, in a dust collector during the manufacture of cement. Usually, large quantities of CKD are collected in the production of cement that are commonly disposed of as waste. The CKD may be present in the cement slurries in any suitable amount, including, but not limited to an amount in the range of about 0% to about 99% bwoc. In some examples the CKD may be present in an amount ranging between any of and/or including any of about 1%, about 5%, about 10%, about 20%, about 40%, about 60%, about 80%, or about 90% bwoc. Those of ordinary skill in the art, with the benefit of this disclosure, will be able to select an appropriate amount of CKD for a particular application.

The cement slurries may include natural glass such as perlite. Certain natural glasses may exhibit cementitious properties, in that it may set and harden in the presence of hydrated lime and water. The natural glass may be present in the cement slurries in any suitable amount, including, but not limited to an amount in the range of about 0% to about 99% bwoc. In some examples the natural glass may be present in an amount ranging between any of and/or including any of about 1%, about 5%, about 10%, about 20%, about 40%, about 60%, about 80%, or about 90% bwoc. Those of ordinary skill in the art, with the benefit of this disclosure, will be able to select an appropriate amount of silica source for a particular application.

Clays may be included in the cement slurries. Some clays may include shale or metakaolin. Among other things, clays included in the cement slurries may react with excess lime to form a suitable cementing material, for example, calcium silicate hydrate. A variety of clays are suitable, including those including silicon, aluminum, calcium, and/or magnesium. An example of a suitable shale includes vitrified shale. Zeolites may also be included in the cement slurries. Zeolites generally are porous alumino-silicate minerals that may be either a natural or synthetic material. Synthetic zeolites are based on the same type of structural cell as natural zeolites and may include aluminosilicate hydrates. As used herein, the term "zeolite" refers to all natural and synthetic forms of zeolite. Examples of zeolites may include, without limitation, mordenite, zsm-5, zeolite x, zeolite y, zeolite a, etc. Furthermore, examples including zeolite may include zeolite in combination with a cation such as $Na^+$, $K^+$, $Ca^{2+}$, $Mg^{2+}$, etc. Zeolites including cations such as sodium may also provide additional cation sources to the cement slurry as the zeolites dissolve. The clays and zeolites may be present in the cement slurries in any suitable amount, including, but not limited to an amount in the range of about 0% to about 99% bwoc. In some examples the clays and zeolites may be present in an amount ranging between any of and/or including any of about 1%, about 5%, about 10%, about 20%, about 40%, about 60%, about 80%, or about 90% bwoc. Those of ordinary skill in the art, with the benefit of this disclosure, will be able to select an appropriate amount of clays and/or zeolite for a particular application.

The cement slurries may further include hydrated lime or calcium hydroxide. In some examples, the hydrated lime may be provided as quicklime (calcium oxide) which hydrates when mixed with water to form the hydrated lime. The hydrated lime may be included in examples of the cement slurries. Where present, the hydrated lime may be included in the cement slurries in an amount in the range of from about 10% to about 100% by weight of the silica source, for example. In some examples, the hydrated lime may be present in an amount ranging between any of and/or including any of about 10%, about 20%, about 40%, about 60%, about 80%, or about 100% by weight of the silica source. One of ordinary skill in the art, with the benefit of this disclosure, will recognize the appropriate amount of hydrated lime to include for a chosen application.

In some examples, the cement slurries may include a calcium source other than hydrated lime. In general, calcium and a high pH, for example a pH of 7.0 or greater, may be needed for certain cementitious reactions to occur. A potential advantage of hydrated lime may be that calcium ions and hydroxide ions are supplied in the same molecule. In another example, the calcium source may be $Ca(NO_3)_2$ or $CaCl_2$ with the hydroxide being supplied form NaOH or KOH, for example. One of ordinary skill would understand the alternate calcium source and hydroxide source may be included in a cement slurry in the same way as hydrated lime. For example, the calcium source and hydroxide source may be included in a silica source-to-hydrated-lime weight ratio of about 10:1 to about 1:1 or a ratio of about 3:1 to about 5:1. Where present, the alternate calcium source and hydroxide source may be included in the cement slurries in an amount in the range of from about 10% to about 100% by weight of the silica source, for example. In some examples, the alternate calcium source and hydroxide source may be present in an amount ranging between any of and/or including any of about 10%, about 20%, about 40%, about 60%, about 80%, or about 100% by weight of the silica source. One of ordinary skill in the art, with the benefit of this disclosure, will recognize the appropriate amount of alternate calcium source and hydroxide source to include for a chosen application.

The cement slurries may include cement additives that may impart desirable properties to the cementing slurry. Examples of such additives include, but are not limited to: weighting agents, retarders, accelerators, activators, gas control additives, lightweight additives, gas-generating additives, mechanical-property-enhancing additives, lost-circulation materials, filtration-control additives, fluid-loss-control additives, defoaming agents, foaming agents, dispersants, thixotropic additives, suspending agents, and combinations thereof. One of ordinary skill in the art, with the benefit of this disclosure, will be able to select an appropriate additive for a particular application.

The cement slurries disclosed herein may be used in a variety of subterranean applications, including primary and remedial cementing. The cement slurries may be introduced into a subterranean formation and allowed to set. In primary cementing applications, for example, the cement slurries may be introduced into the annular space between a conduit located in a wellbore and the walls of the wellbore (and/or a larger conduit in the wellbore), wherein the wellbore penetrates the subterranean formation. The cement slurry may be allowed to set in the annular space to form an annular sheath of hardened cement. The cement slurry may form a barrier that prevents the migration of fluids in the wellbore. The cement slurry may also, for example, support the conduit in the wellbore. In remedial cementing applications, the cement slurries may be used, for example, in squeeze cementing operations or in the placement of cement plugs. By way of example, the cement slurries may be placed in a wellbore to plug an opening (e.g., a void or crack) in the formation, in a gravel pack, in the conduit, in the cement sheath, and/or between the cement sheath and the conduit (e.g., a micro annulus).

Figure 6:
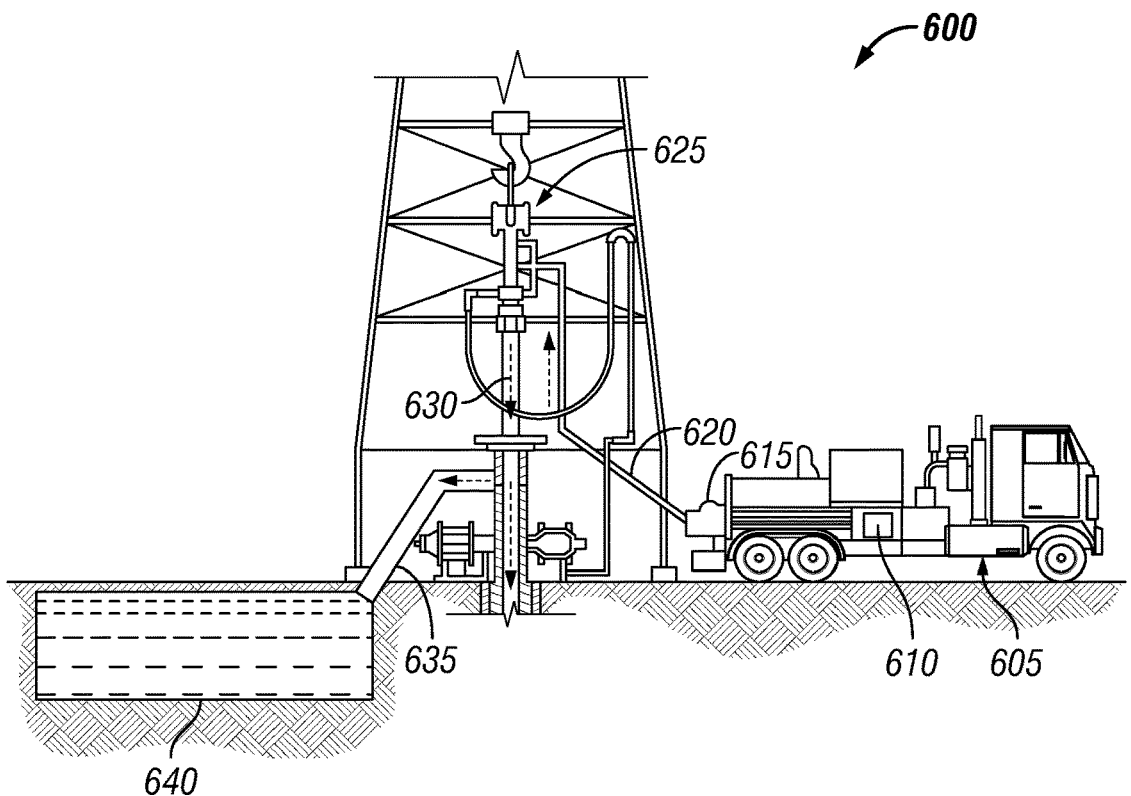
FIG. 6 illustrates surface equipment that may be used in the placement of a cement slurry.

An example primary cementing technique using a cement slurry will now be described with reference to FIGS. 6 and 7. FIG. 6 illustrates surface equipment 600 that may be used in the placement of a cement slurry in accordance with certain examples. It will be noted that while FIG. 6 generally depicts a land-based operation, those skilled in the art will readily recognize that the principles described herein are equally applicable to subsea operations that employ floating or sea-based platforms and rigs, without departing from the scope of the disclosure. As illustrated by FIG. 6, the surface equipment 600 may include a cementing unit 605, which may include one or more cement trucks. The cementing unit 605 may include mixing equipment 610 and pumping equipment 610 as will be apparent to those of ordinary skill in the art. Cementing unit 605, or multiple cementing units 605, may pump a cement slurry 630 through a feed pipe 620 and to a cementing head 625 which conveys the cement slurry 630 downhole. Cement slurry 630 may displace other fluids present in the wellbore, such as drilling fluids and spacer fluids, which may exit the wellbore through an annulus and flow through pipe 635 to mud pit 640.

Figure 7:
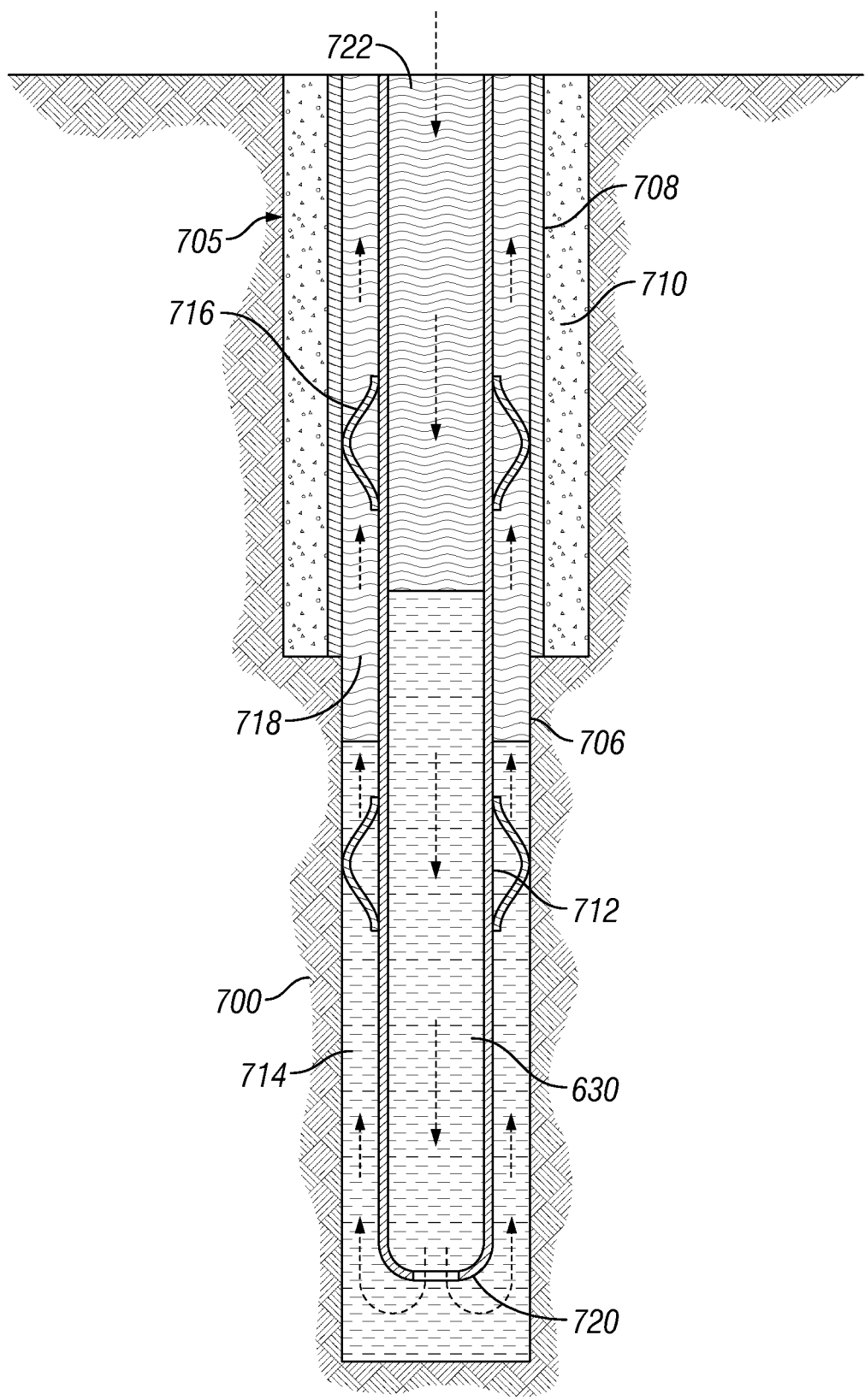
FIG. 7 illustrates the placement of a cement slurry into a subterranean formation.

FIG. 7 generally depicts the placement of cement slurry 630 into a subterranean formation 700 in accordance with example examples. As illustrated, a wellbore 705 may be drilled into the subterranean formation 700. While wellbore 705 is shown extending generally vertically into the subterranean formation 700, the principles described herein are also applicable to wellbores that extend at an angle through the subterranean formation 700, such as horizontal and slanted wellbores. As illustrated, the wellbore 705 includes walls 706. In the illustrated example, a surface casing 708 has been inserted into the wellbore 705. The surface casing 708 may be cemented in the wellbore 705 by a cement sheath 710. In alternative examples, surface casing 708 may be secured in the wellbore 705 by a hardened resin or hardened resin-cement composite sheath in place of cement sheath 710. In the illustrated example, one or more additional conduits (e.g., intermediate casing, production casing, liners, etc.), shown here as casing 712 may also be disposed in the wellbore 705. As illustrated, there is a wellbore annulus 714 formed between the casing 712 and the walls 706 of the wellbore 705 and/or the surface casing 708. One or more centralizers 716 may be attached to the casing 712, for example, to centralize the casing 712 in the wellbore 705 prior to and during the cementing operation.

With continued reference to FIG. 7, a first spacer fluid 718 may be pumped down the interior of the casing 712. The first spacer fluid 718 may be allowed to flow down the interior of the casing 712 through the casing shoe 720 at the bottom of the casing 712 and up around the casing 712 into the wellbore annulus 714. After the first spacer fluid 718 has been pumped into the casing 712, cement slurry 630 may be pumped into the casing 712. In a manner similar to pumping the first spacer fluid 718, the cement slurry 630 may be allowed to flow down the interior of the casing 712 through the casing shoe 720 at the bottom of the casing 712 and up around the casing 712 into the wellbore annulus 714. After the cement slurry 630 has been pumped into the casing 712, a second spacer fluid 722 may be pumped into casing 712 and allowed to flow down the interior of the casing 712. The first spacer fluid 718 and the second spacer fluid 722 may be used to separate the cement slurry 630 from fluids introduced into the wellbore 705 either in front of or behind the cement slurry 630. Once the cement slurry 630 has been placed into the desired position in the wellbore annulus 714, the cement slurry 630 may be allowed to set in the wellbore annulus 714, for example, to form a hardened resin sheath that supports and positions the casing 712 in the wellbore 705. Alternatively, one or no spacer fluids may be used, and cement slurry 630 may not need to be separated from other fluids introduced previously or subsequently into wellbore 705. While not illustrated, other techniques may also be utilized for introduction of the cement slurry 630. By way of example, reverse circulation techniques may be used that include introducing the cement slurry 630 into the subterranean formation 700 by way of the wellbore annulus 714 instead of through the casing 712. These techniques may also utilize a first spacer fluid 718 and a second spacer fluid 722, or they may utilize one or none spacer fluids. As it is introduced, the cement slurry 630 may displace the first spacer fluid 718. At least a portion of the first spacer fluid 718 may exit the wellbore annulus 714 via a flow line 653 and be deposited, for example, in one or more mud pits 640, as shown on FIG. 6.

Figure 8:
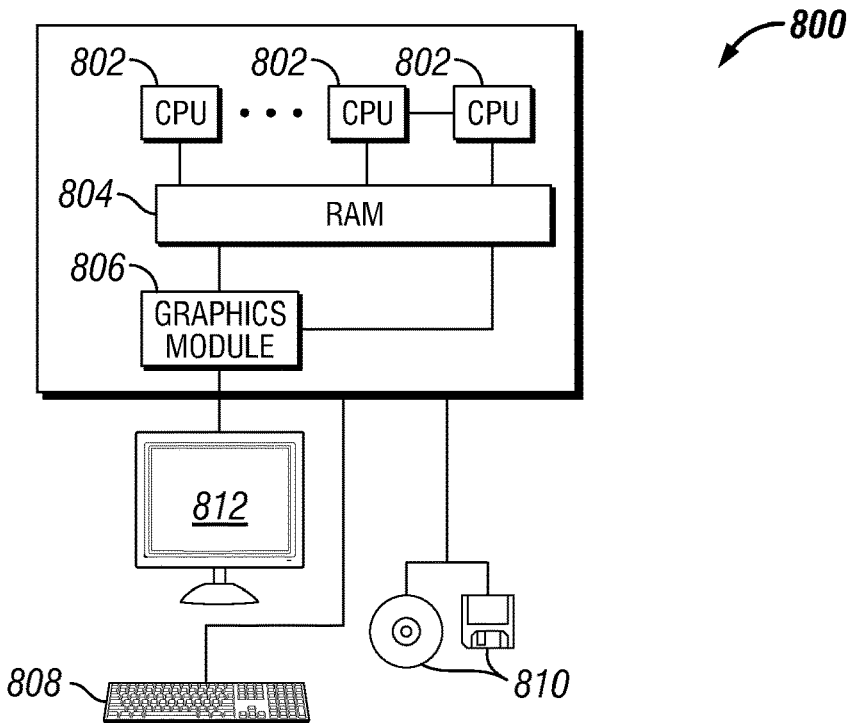
FIG. 8 is a schematic illustration of an example of an information handling system.

FIG. 8 generally illustrates an example of an information handling system 800 that may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 800 may be a personal computer, a network storage device, or any other suitable device and may vary in size, shape, performance, functionality, and price. In examples, information handling system 100 may be referred to as a supercomputer or a graphics supercomputer.

As illustrated, information handling system 800 may include one or more central processing units (CPU) or processors 802. Information handling system 800 may also include a random-access memory (RAM) 804 that may be accessed by processors 802. It will be noted information handling system 800 may further include hardware or software logic, ROM, and/or any other type of nonvolatile memory. Information handling system 800 may include one or more graphics modules 806 that may access RAM 804. Graphics modules 806 may execute the functions carried out by a Graphics Processing Module (not illustrated), using hardware (such as specialized graphics processors) or a combination of hardware and software. A user input device 808 may allow a user to control and input information to information handling system 800. Additional components of the information handling system 800 may include one or more disk drives, output devices 812, such as a video display, and one or more network ports for communication with external devices as well as a user input device 808 (e.g., keyboard, mouse, etc.). Information handling system 800 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media 810 such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 9:
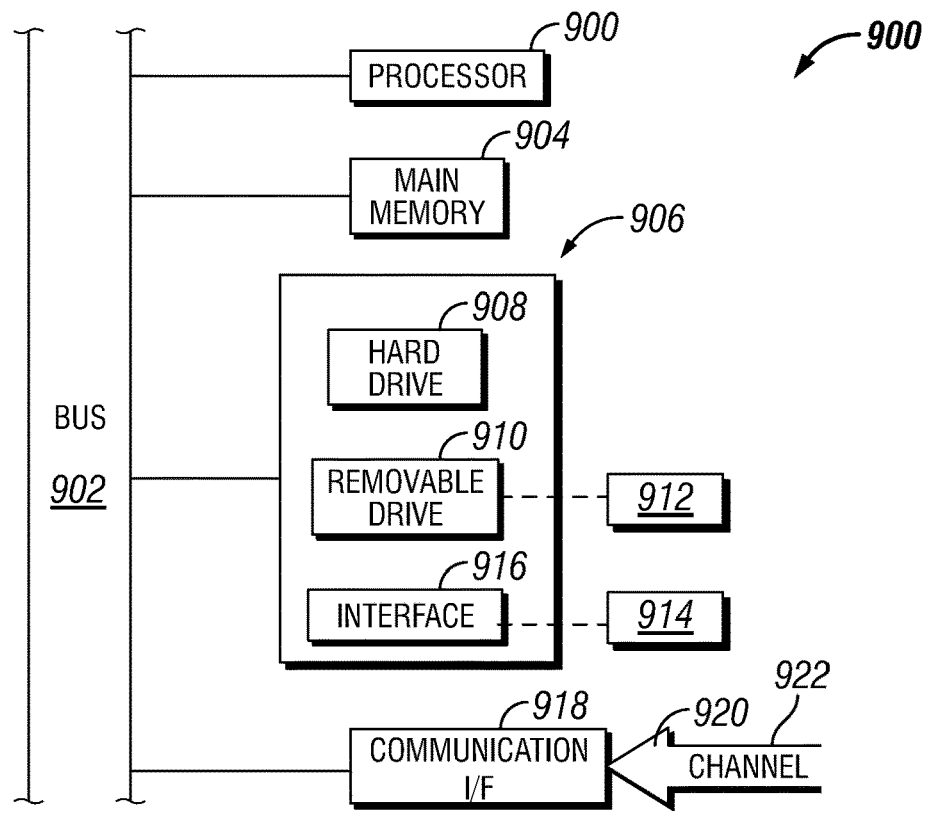
FIG. 9 illustrates additional detail of an information handling system.

FIG. 9 illustrates additional detail of information handling system 800. For example, information handling system 800 may include one or more processors, such as processor 900. Processor 900 may be connected to a communication bus 902. Various software embodiments are described in terms of this exemplary computer system. After reading this description, it will become apparent to a person skilled in the relevant art how to implement the example embodiments using other computer systems and/or computer architectures.

Information handling system 800 may also include a main memory 904, preferably random-access memory (RAM), and may also include a secondary memory 906. Secondary memory 906 may include, for example, a hard disk drive 908 and/or a removable storage drive 910, representing a floppy disk drive, a magnetic tape drive, an optical disk drive, etc. Removable storage drive 910 may read from and/or writes to a removable storage unit 912 in any suitable manner. Removable storage unit 912, represents a floppy disk, magnetic tape, optical disk, etc. which is read by and written to by removable storage drive 910. As will be appreciated, removable storage unit 912 includes a computer usable storage medium having stored therein computer software and/or data.

In alternative embodiments, secondary memory 906 may include other operations for allowing computer programs or other instructions to be loaded into information handling system 800. For example, a removable storage unit 914 and an interface 916. Examples of such may include a program cartridge and cartridge interface (such as that found in video game devices), a removable memory chip (such as an EPROM, or PROM) and associated socket, and other removable storage units 914 and interfaces 916 which may allow software and data to be transferred from removable storage unit 914 to information handling system 800.

In examples, information handling system 800 may also include a communications interface 918. Communications interface 918 may allow software and data to be transferred between information handling system 800 and external devices. Examples of communications interface 918 may include a modem, a network interface (such as an Ethernet card), a communications port, a PCMCIA slot and card, etc. Software and data transferred via communications interface 918 are in the form of signals 920 that may be electronic, electromagnetic, optical or other signals capable of being received by communications interface 918. Signals 920 may be provided to communications interface via a channel 922. Channel 922 carries signals 920 and may be implemented using wire or cable, fiber optics, a phone line, a cellular phone link, an RF link and/or any other suitable communications channels. For example, information handling system 800 includes at least one memory 904 operable to store computer-executable instructions, at least one communications interface 902, 918 to access the at least one memory 904; and at least one processor 900 configured to access the at least one memory 904 via the at least one communications interface 902, 918 and execute computer-executable instructions.

In this document, the terms "computer program medium" and "computer usable medium" are used to generally refer to media such as removable storage unit 912, a hard disk installed in hard disk drive 908, and signals 920. These computer program products may provide software to computer system 800.

Computer programs (also called computer control logic) may be stored in main memory 904 and/or secondary memory 906. Computer programs may also be received via communications interface 918. Such computer programs, when executed, enable information handling system 800 to perform the features of the example embodiments as discussed herein. In particular, the computer programs, when executed, enable processor 900 to perform the features of the example embodiments. Accordingly, such computer programs represent controllers of information handling system 800.

In examples with software implementation, the software may be stored in a computer program product and loaded into information handling system 800 using removable storage drive 910, hard disk drive 908 or communications interface 918. The control logic (software), when executed by processor 900, causes processor 900 to perform the functions of the example embodiments as described herein.

In examples with hardware implementation, hardware components such as application specific integrated circuits (ASICs). Implementation of such a hardware state machine so as to perform the functions described herein will be apparent to persons skilled in the relevant art(s). It will be noted that the disclosure may be implemented at least partially on both hardware and software.

The methods described herein may be carried out, at least in part, using a computer system including a computer-accessible medium, the computer-accessible medium containing a computer program that causes a processor to execute instructions that carry out at least some of the method steps described herein. In general, a computer-accessible medium may include any tangible or non-transitory storage media or memory media such as electronic, magnetic, or optical media—e.g., disk or CD/DVD-ROM coupled to the computer. The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM), flash memory, or other volatile memory types. Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The following statements may describe some embodiments of the present application and should not be read to be limiting to any particular embodiment.

Statement 1. A method comprising: providing a model of cement induction time; designing a cement composition, based at least partially, on the model of cement induction time; and preparing the cement composition.

Statement 2. The method of statement 1 wherein the model of cement induction time includes a regression model of induction time data and physicochemical data.

Statement 3. The method of any of statements 1-2 wherein the regression model is a function of at least one of chemical composition, density, temperature, or pressure.

Statement 4. The method of any of statements 1-3 further comprising: modifying the cement composition to produce a modified cement composition if a predicted induction time of the cement composition does not meet or exceed a target induction time; calculating a predicted induction time of the modified cement composition using the induction time model; comparing the predicted induction time of the modified cement composition to the target induction time; and preparing the modified cement composition if the predicted induction time of the modified cement composition meets or exceeds the target induction time.

Statement 5. The method of any of statements 1-4 further comprising iteratively modifying the cement composition until the predicted induction time of the modified cement composition meets or exceeds the target induction time.

Statement 6. The method of any of statements 1-5 wherein iteratively modifying the cement composition includes modifying a concentration of the water, a concentration of at least one cementitious component, or both.

Statement 7. A method comprising: providing a plurality of cementitious components; generating a design of a cement composition, wherein the cement composition includes one or more cementitious components selected from the plurality of cementitious components; calculating a predicted model parameter using a model of induction time; comparing the predicted model parameter of the cement composition to a design parameter, wherein the design parameter is at least one of induction time requirement, thickening time, and compressive strength time requirement; and preparing the cement composition if the predicted design parameter meets or exceeds the design parameter.

Statement 8. The method of statement 7 wherein the induction time model includes a regression model of induction time data and physicochemical data.

Statement 9. The method of any of statements 7-8 wherein the regression model is a function of at least one of chemical composition, density, temperature, or pressure.

Statement 10. The method of any of statements 7-9 wherein the design parameter includes an induction time.

Statement 11. The method of any of statements 7-10 wherein the design parameter includes a time to 345 kPa.

Statement 12. The method of any of statements 7-11 wherein the design parameter includes a time to 70 bc.

Statement 13. The method of any of statements 7-12 further comprising pumping the cement composition into a wellbore.

Statement 14. A non-transitory computer readable medium having data stored therein representing software executable by a computer, the software including instructions comprising: instructions to generate a design of a cement composition comprising at least one a plurality of cementitious components based on a model of cement induction time.

Statement 15. The non-transitory computer readable medium of claim 14 wherein the model of cement induction time is a function of physicochemical parameters, a model of extent of hydration, a model of effective time, a model of activation energy.

Statement 16. The non-transitory computer readable medium of claim 14 wherein the model of cement induction time includes a regression model of induction time data and physicochemical data.

Statement 17. The non-transitory computer readable medium of claim 16 further comprising instructions to accept a downhole temperature Statement 18. The non-transitory computer readable medium of claim 17 wherein the instructions to generate the cement composition includes instruction to generate the cement composition based at least in part on the downhole temperature.

Statement 19. The non-transitory computer readable medium of claim 14 further comprising instructions to accept a design parameter comprising a time to transition from a pumpable fluid state to a hardened set state, and wherein instructions to generate the cement composition further includes instructions to generate the cement composition based at least in part on the time to transition from a pumpable fluid state to a hardened set state.

Statement 20. The non-transitory computer readable medium of claim 19 wherein the time to transition from a pumpable fluid state to a hardened set state is at least one of time to 70 bc or a time to 345 kPa.

The disclosed cement compositions and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The cement compositions may also directly or indirectly affect any mixing hoppers and retention pits and their assorted variations.

It will be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification will be adopted.

What is claimed is:

1. A method comprising:
   providing a model of cement induction time, wherein the model of cement induction time comprises a regression model of induction time data and physicochemical data;
   designing a proposed cement composition, based at least partially, on the model of cement induction time;
   preparing the proposed cement composition;
   modifying the proposed cement composition to produce a modified cement composition if a predicted induction time of the proposed cement composition does not meet or exceed a target induction time;
   calculating the predicted induction time of the modified cement composition using the model of cement induction time;
   comparing the predicted induction time of the modified cement composition to the target induction time; and
   preparing the modified cement composition if the predicted induction time of the modified cement composition meets or exceeds the target induction time.

2. The method of claim 1 wherein the regression model is a function of at least one of chemical composition, density, temperature, or pressure.

3. The method of claim 1 further comprising iteratively modifying the proposed cement composition until the predicted induction time of the modified cement composition meets or exceeds the target induction time.

4. The method of claim 3 wherein iteratively modifying the proposed cement composition comprises modifying a concentration of the water, a concentration of at least one cementitious component, or both.

5. The method of claim 1 wherein the model of cement induction time does not include a direct model of cementitious reactions.

6. The method of claim 1 wherein the physicochemical data comprises surface area, particle size, density, or combinations thereof.

7. The method of claim 1 wherein the physicochemical data comprises specific surface area.

8. The method of claim 1 wherein the model of cement induction time does not include a direct model of cementitious reactions.

9. The method of claim 1 wherein the physicochemical data comprises surface area, particle size, density, or combinations thereof.

10. A method comprising:
    providing a plurality of cementitious components;
    generating a design of a cement composition, wherein the cement composition comprises one or more cementitious components selected from the plurality of cementitious components;
    calculating a predicted model parameter using a model of induction time, wherein the model of induction time comprises a regression model of induction time data and physicochemical data;
    comparing the predicted model parameter of the cement composition to a design parameter, wherein the design parameter is at least one of induction time requirement, thickening time, and compressive strength time requirement; and
    preparing the cement composition if the predicted design parameter meets or exceeds the design parameter.

11. The method of claim 10 wherein the regression model is a function of at least one of chemical composition, density, temperature, or pressure.

12. The method of claim 10 wherein the design parameter comprises an induction time.

13. The method of claim 10 wherein the design parameter comprises a time to 345 kPa.

14. The method of claim 10 wherein the design parameter comprises a time to 70 bc.

15. The method of claim 10 further comprising pumping the cement composition into a wellbore.

16. A method comprising:
    generating a proposed cement slurry comprising two or more cementitious components;
    inputting physicochemical properties of the two or more cementitious components into a model of cement induction time, wherein the model comprises a regression model of induction time data and physicochemical data to output a predicted cement induction time at a downhole temperature and pressure;

iteratively modifying the proposed cement slurry until the predicted cement induction an induction time requirement is met or exceeded;

preparing the proposed cement slurry;

measuring an induction time of the proposed cement slurry; and comparing the measured induction time of the proposed cement slurry to determine if the measured induction time meets or exceeds the induction time requirement.

17. The method of claim 16 wherein the regression model is a function of at least one of chemical composition, density, temperature, or pressure.

18. The method of claim 16 wherein the physicochemical data comprises specific surface area.

19. The method of claim 16 wherein the physicochemical data comprises surface area, particle size, density, or combinations thereof.

* * * * *